Feb. 23, 1954
W. A. SCHAICH
2,670,175
REAR MOUNTED CRANE
Filed Oct. 22, 1951
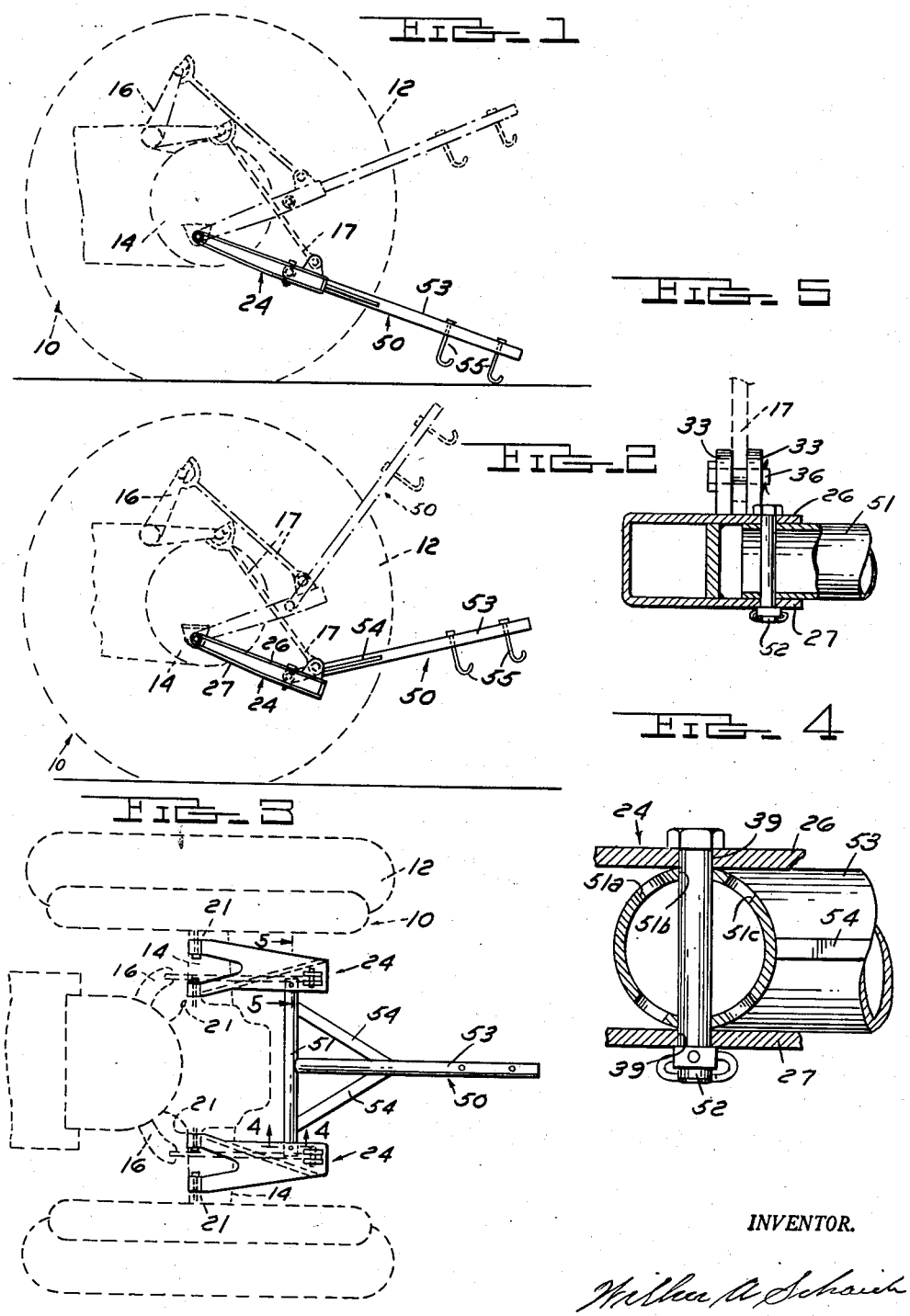
INVENTOR.
William A. Schaich Patented Feb. 23, 1954

2,670,175

UNITED STATES PATENT OFFICE 2,670,175

REAR MOUNTED CRANE

Wilbur A. Schaich, Goodrich, Mich., assignor to Dearborn Motors Corporation, Birmingham, Mich., a corporation of Delaware Application October 22, 1951, Serial No. 252,549

1 Claim. (Cl. 254—124)

This invention relates to an improved material handling device, and more particularly a rear mounted crane, for use on tractors having laterally spaced, power-lifted trailing hitch links.

In the co-pending application of Ralph C. Frevik and Frederick D. Sawyer, Serial No. 234,597, filed June 30, 1951, and assigned to the assignee of this application, there is disclosed and claimed an improved hitch link structure for tractors of the type having a pair of laterally spaced trailing hitch links, power-lifted by a built-in hydraulic system contained on the tractor.

It is an object of this invention to effectively utilize the unique structural configuration of the new type of hitch elements disclosed in such copending application to effect the simplified mounting of a rear mounted material handling device, which may constitute a bucket or fork, or in the example to be particularly described and illustrated, a crane.

A further object of this invention is to provide a greatly simplified and more economical rear end crane construction for use with tractors having power-lifted trailing hitch links.

The specific nature of this invention as well as other objects and advantages thereof, will become apparent to those skilled in the art from the following detailed description taken in conjunction with the attached drawings on which, by way of preferred example only, is illustrated one embodiment of this invention.

On the drawings:

Figure 1 is a side elevational view of an improved material handling device embodying this invention assembled to the rear portion of a tractor;

Figure 2 is a view similar to Figure 1 but illustrating the change in angular position of the boom of the material handling device that may be effected by the adjustment provided on the improved device;

Figure 3 is a plan view of Figure 1;

Figure 4 is an enlarged scale partial sectional view taken on the plane 4—4 of Figure 3; and Figure 5 is an enlarged scale partial sectional view taken on the plane 5—5 of Figure 3.

As shown on the drawings:

In Figures 1 through 3, the reference numeral 10 refers generally to a well-known type of tractor having rear wheels 12 mounted on a laterally extending rear axle (not shown) confined within an axle housing 14. Atop the rear axle housing 14 are located a pair of laterally spaced, power-lifted rock arms 16 pivoted or otherwise secured to depending lift links 17. As is well-known, rock arms 16 are operable by a built-in hydraulic ram (not shown).

Laterally spaced portions of the rear axle housing 14 located on opposite sides of the central longitudinal plane of the tractor are provided with integrally formed or rigidly secured attachment bosses 20 (Figure 3), while additional laterally spaced brackets 21 are also carried by the rear axle housing 14 outwardly of and laterally aligned with the bosses 20. Pivotally supported between the bosses 20 and the brackets 21 are a pair of hitch elements 24 which constitute the forward elements of a two-piece hitch link described in detail in the above mentioned co-pending application. Briefly, each forward hitch element 24 comprises vertically spaced upper and lower plates 26 and 27, respectively, which are identical in configuration, to provide forwardly extending laterally spaced yoke arms 28, each terminating in aligned, laterally bored attachment bosses 29. The attachment bosses 29 are respectively mounted by pivot bolts 30 on the bosses 20 and the brackets 21 carried by the rear axle housing. The pivot bolts 30 are laterally aligned and it will be seen that the forward link element 24 will thus pivot for vertical movement relative to the tractor about the pivotal axis provided by the bolts 30.

The upper and lower forward hitch element plates 26 and 27, respectively, are joined by means of laterally and rearwardly extending interposed vertical webs 31 which impart to the hitch elements a generally channel-shaped configuration. Additional vertical webs 32 may be provided at the extreme rear portion of the plates 26 and 27. The upper plate 26 of each of the forward hitch elements 24 is provided with a pair of closely laterally-spaced upstanding lugs 33 which pivotally connect, as by bolt 36, to the free end of the adjacent depending lift link 17. Thus, each of the forward elements 24 may be elevated or lowered in a vertical plane by actuation of the power-lifted arm 16.

As described in the above referred to co-pending application, a plurality of laterally-spaced, vertical holes 39 are provided in the medial portions of the hitch elements 24. In the hitch link structure of the above referred to co-pending application, selected ones of these laterally-spaced holes are employed for the mounting of rear hitch elements. In accordance with this invention, such holes are conveniently utilized to effect the mounting of a material handling device 50.

The material handling device 50 comprises a transverse frame member 51 which is preferably of cylindrical or tubular configuration and has its opposite ends respectively received within the channel-shaped portion of the hitch elements 24, and such ends are rigidly secured to the hitch elements 24 by the insertion of removable pin 52 through a selected one of the laterally-spaced holes 39 in the plates 26 and 27. To receive the pin 52, each end of the transverse frame element 51 is provided with a plurality of holes 51a, 51b and 51c, each of which are relatively angularly disposed with respect to the other. Accordingly, the transverse frame element 51 may be selectively mounted between the hitch elements 24 in any one of a plurality of relative angular positions about the longitudinal axis of the transverse frame element 51.

A boom 53 is rigidly secured to the central portions of the transverse frame element 51 and additionally braced by angularly disposed braces 54. Any desired form of material handling device may be mounted on the free end of the boom 53, but for simplicity, there is shown only a pair of longitudinally spaced hooks 55 which will permit the material handling device 50 to function as a rear end crane.

Obviously, since the material handling device 50 is rigidly secured by the pins 52 to the hitch elements 24, the boom 53 will be raised or lowered concurrently with the movements of the power-lifted hitch elements.

Normally, as illustrated in Figure 1, the transverse frame element 51 will be mounted between the hitch elements 24 in the angular position which produces a substantially longitudinal alignment of the boom 53 with such hitch element. However, if it is desired to increase the lifting capacity of the boom 53, or to lift the load in close proximity to the rear end of the tractor, then the pins 52 may be respectively inserted in holes 51c which produces an angular disposition of the boom 53 with respect to the hitch elements 24, as illustrated in Figure 2.

From the foregoing description, it is clearly apparent that this invention provides greatly simplified and economical construction of a material handling device for use on tractors having laterally-spaced, power-lifted hitch links.

It will, of course, be understood that various details of construction may be varied through a wide range without departing from the principles of this invention and it is, therefore, not the purpose to limit the patent granted hereon otherwise than necessitated by the scope of the appended claim.

I claim:

For use with a tractor having a pair of laterally spaced, power-lifted trailing hitch elements, each of said hitch elements having a channel-shaped rear end portion with vertically spaced plate elements, a material handling device comprising a transverse tubular frame element, a rearwardly projecting boom rigidly secured to the medial portions of said frame element, the ends of said frame element being respectively insertable between said plate elements of said hitch elements, a removable pin traversing each pair of plate elements of said channel-shaped portions, each said end of said frame element having a plurality of relatively angularly disposed holes therein for selectively receiving said pin, thereby selectively varying the angular relationship of said boom relative to the tractor.

WILBUR A. SCHAICH.

References Cited in the file of this patent

UNITED STATES PATENTS

| Number | Name | Date |
|---|---|---|
| 2,249,658 | Kemner | July 15, 1941 |
| 2,446,584 | Green | Aug. 10, 1948 |
| 2,512,635 | Flowers | June 27, 1950 |
| 2,530,656 | Fall | Nov. 21, 1950 |
| 2,591,435 | Hunsaker et al. | Apr. 1, 1952 |

FOREIGN PATENTS

| Number | Country | Date |
|---|---|---|
| 14,048 | Great Britain | June 24, 1903 |